United States Patent [19]
Maeshiba

[11] 3,738,170
[45] June 12, 1973

[54] FLOW METER FOR MEASURING SMALL QUANTITIES OF LIQUID FUEL

[76] Inventor: Sozaburo Maeshiba, 33-32 4-chome Hakataekimae, Fukuoka, Japan

[22] Filed: July 2, 1971

[21] Appl. No.: 159,300

[52] U.S. Cl. .................................................. 73/217
[51] Int. Cl. ............................................ G01p 1/00
[58] Field of Search .................... 73/217, 218, 220; 177/83, 84

[56] References Cited
UNITED STATES PATENTS
3,599,607  8/1971  Wallicit............................. 73/217 X
2,998,722  9/1961  Jaquith ................................ 73/219
3,093,973  6/1963  Williams ............................. 73/229

Primary Examiner—Herbert Goldstein
Attorney—Holcombe, Wetherill & Brisebois

[57] ABSTRACT

A flow meter for measuring small quantities particularly of liquid fuels. A chamber is provided with cups mounted to rotate in a paddle wheel manner by the flow of liquid. Magnets of opposite polarity are carried by each cup. An electromagnet magnet alternately attracts and repels the cups to bring then into filling and them emptying position. A reed switch is actuated by the magnets to provide a measure of flow and reverse the polarity of the electromagnet.

1 Claim, 5 Drawing Figures

PATENTED JUN 12 1973

FLOW METER FOR MEASURING SMALL QUANTITIES OF LIQUID FUEL

SUMMARY OF THE INVENTION

This invention relates to a flow meter for measuring extremely small quantities of liquid fuel.

The primary object of the invention is to provide a flow meter for measuring extremely small quantities which can measure them accurately.

Another is to provide a measuring mechanism for liquid fuel used in central heating, etc.

The accuracy of conventional flow meters has heretofore been so poor that they are not suitable for measuring the consumption of oil used for central heating, etc., and are especially unsuitable for measuring small quantities from 0.1 L to 4 L per hour. My meter is, however, capable of measuring such quantities quite accurately and is therefore quite suitable for use in the central heating field.

These and other advantages of this invention will be better understood upon consideration of the following detailed description of a preferred embodiment of the invention with reference to the accompanying drawings, in which.

Figure 1:
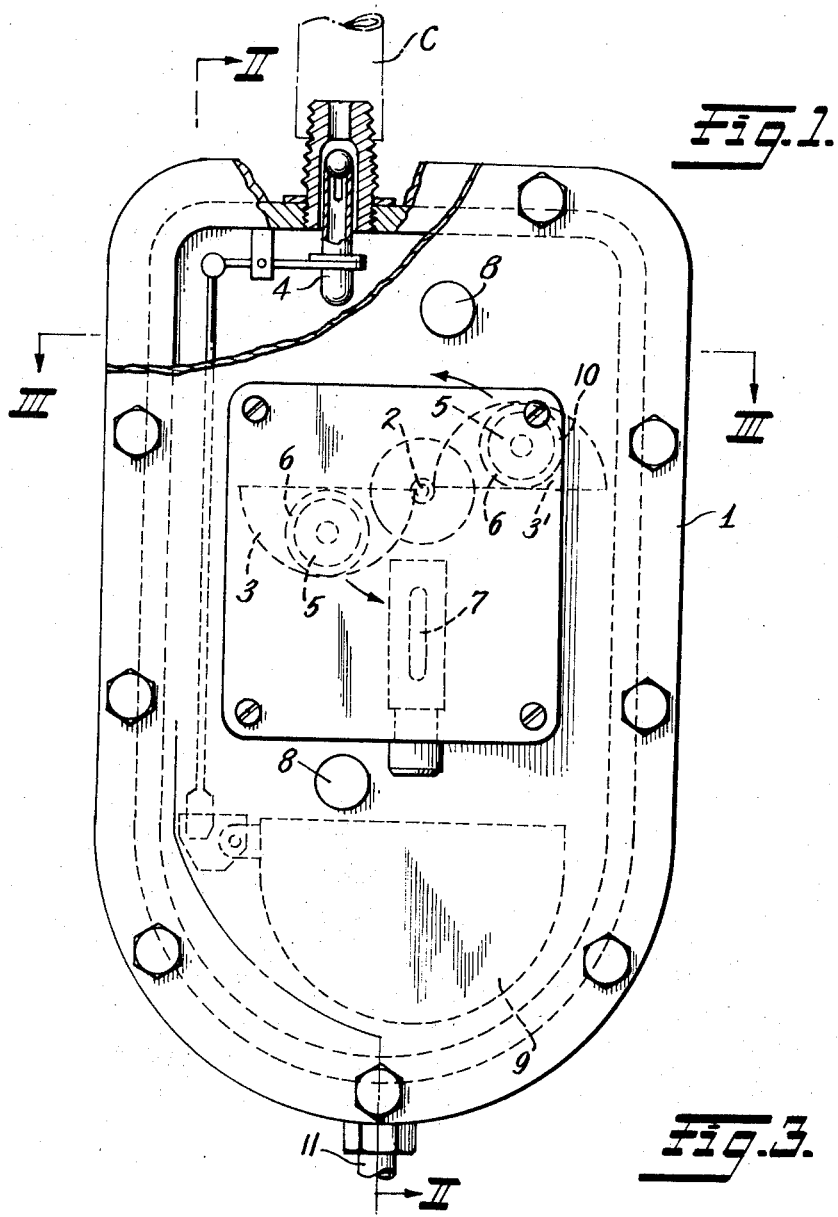
FIG. 1 is a front view of a flow meter for measuring extremely small quantities according to this invention, with part of the casing broken away.
Figure 4:
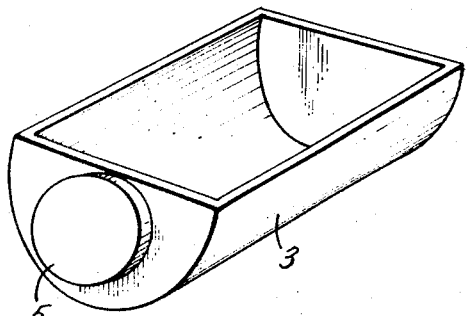
FIG. 4 is a diagram showing the principal part of the flow meter for measuring extremely small quantities according to this invention.
Figure 3:
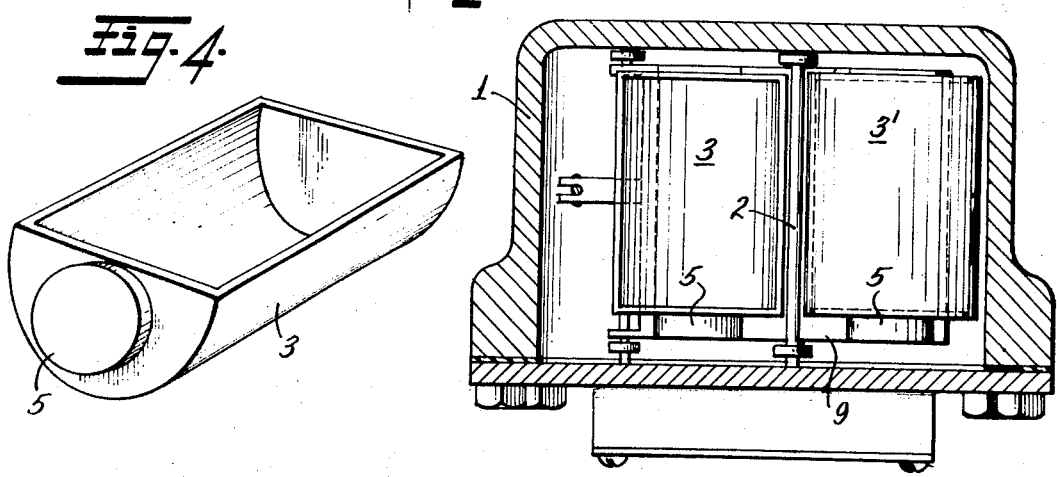
FIG. 3 is a sectional view taken along the line III—III of FIG. 1.
Figure 2:
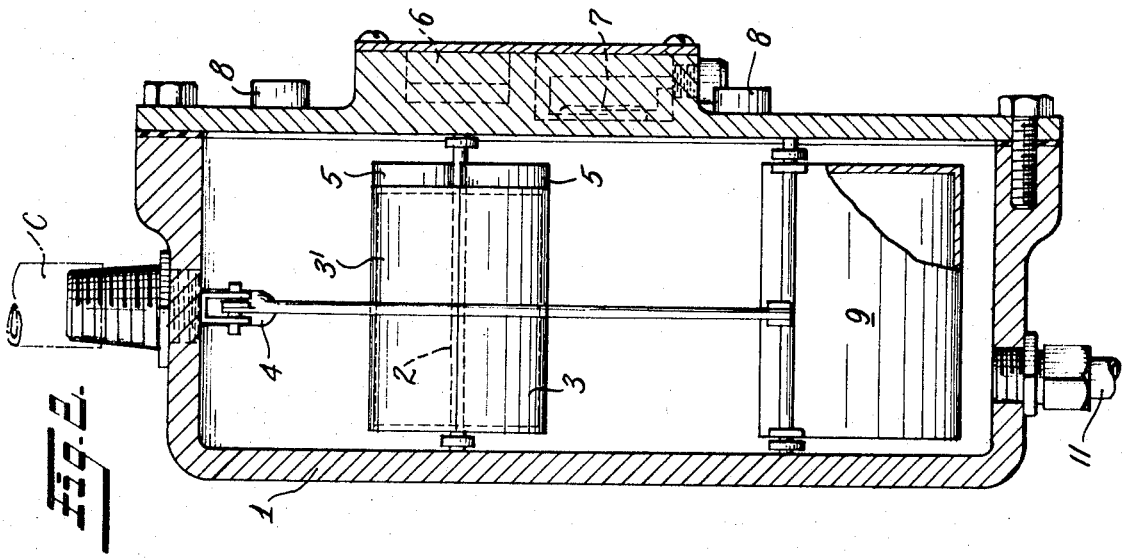
FIG. 2 is a vertical section taken along the line II—II of FIG. 1.
Figure 5:
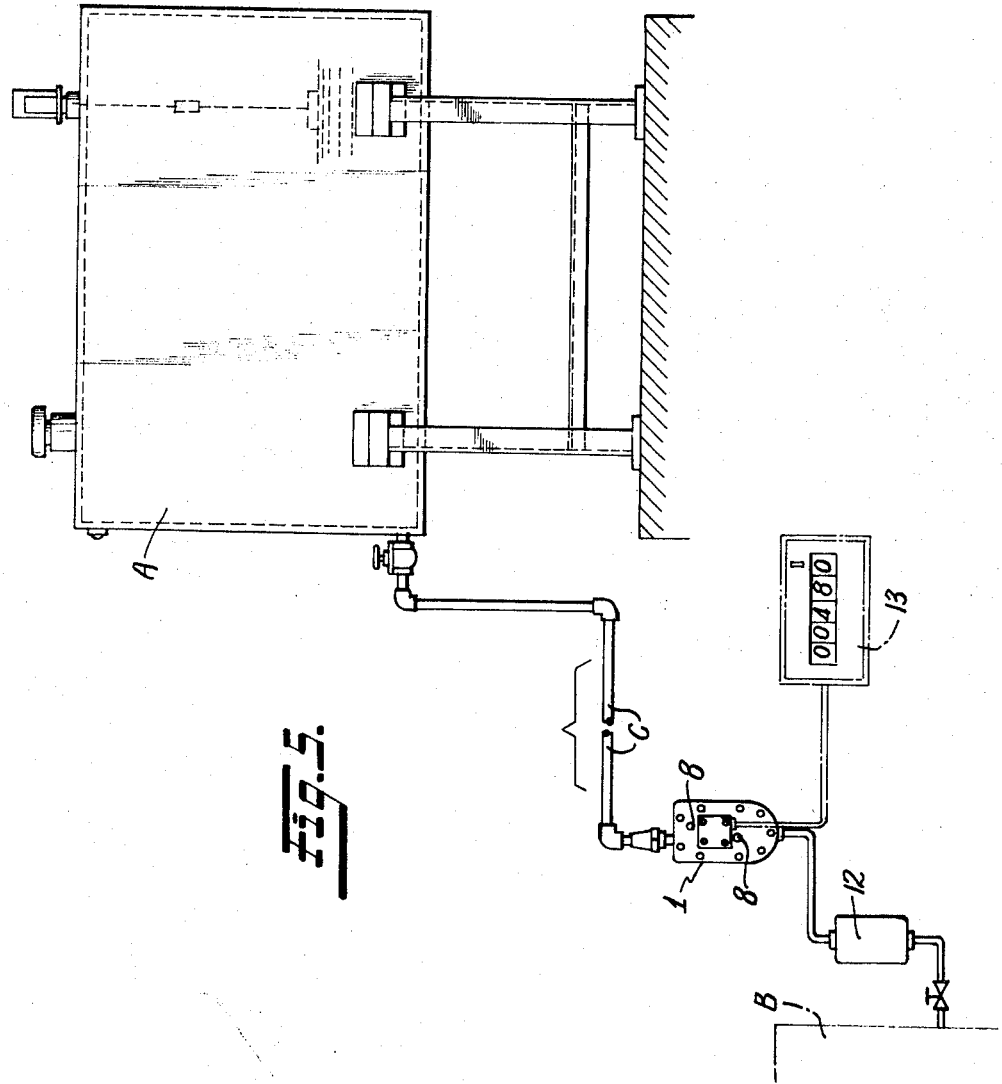
FIG. 5 is a diagram showing the connections when this flow meter for measuring extremely small quantities is used.

Referring now to FIGS. 1–5, the illustrated embodiment of the flow meter according to this invention will now be described.

As shown in the drawings, an oil pipe C connects a liquid fuel tank A to a burner B. The pipe C is interrupted intermediate the tank and burner by a casing 1. A plural of cup-shaped vanes 3, 3' are mounted to turn about a shaft within said casing with each of vanes 3 and 3' projecting from the shaft in the opposite direction. A hole is formed in the upper wall of the casing 1 above the position occupied by a cup-shaped vane when its open side is uppermost.

Each cup-shaped vane carries at one end an electromagnet 5. The poles of these two magnets facing the casing wall are of opposite polarities. An electromagnet 6 is mounted on the wall of the casing 1 in a position such that, when it attracts a magnet 5, the cup carrying that magnet will be in a position to receive a liquid dropped through said hole.

A reed switch 7, adapted to be closed when subjected to a magnetic field, is mounted on the side of the casing in a position such that it will be thrown by the magnets 5 on the vanes as they swing past it. This switch is connected to a counter 13 and a relay 8 for reversing the polarity of the electromagnet 6.

A float 9 actuates a plug 4 which closes the hole through which the fuel is admitted when the level of fuel in the casing rises too high. Reference numeral 11 indicates the outlet from the casing and reference numeral 12 an intermediate holding chamber.

In operation, liquid fuel supplied through the pipe C falls into whichever of the two cup-shaped vanes 3, 3' is waiting beneath the hole through which said fuel is admitted. When a predetermined quantity of fuel has fallen into the vane it swings downwardly, bringing its magnet 5 past the reed switch 7, which temporarily closes thus transmitting a pulse to the counter 13. This also temporarily closes a relay 8 which reverses the polarity of the electromagnet 6, so that the end of the magnet 6 which formerly attracted the magnet 5 on the vane 3, now repels that vane, but attracts the magnet on the vane 3', and vice versa, thus bringing the next vane beneath the hole 4. The fuel then flows out through the outlet 11 into the holding chamber 12.

It will be appreciated that a larger number of cup-shaped vanes may be mounted at equal radial distances about the shaft. Furthermore, simpler magnetic spotting means may then be used to spot the successive vanes beneath the hole through which the fuel is admitted. For example, a simple permanent magnet may be carried by each vane, with the end of the same polarity facing the casing wall in all cases. A simple permanent magnet is likewise mounted in the casing wall with its pole of opposite polarity adjacent the path of travel of the vane-mounted magnets. When there are four or more vanes, the filling of one will depress it far enough to cause the magnet on the wall to attract the magnet on the next vane.

What is claimed is:

1. A flow meter for measuring small quantities of liquids, which meter comprises:

means for supplying a downwardly directed stream of a liquid to be measured, a plurality of cups mounted to rotate about a horizontal axis in a path which brings said cups successively into a receiving position beneath said downwardly directed stream, an electromagnet adjacent said receiving position, and a magnet carried by each cup, each cup-carried magnet having a pole located to be attracted by said electromagnet when near said receiving position with a force insufficient to overcome the force exerted by gravity when only one of said cups is full of said liquid, and those poles of the magnets on adjacent cups which are positioned to be thus attracted being of opposite polarity, a reed switch positioned to be thrown by one of the magnets on said cups whenever a cup departs from said receiving position, means for reversing the polarity of said electromagnet in response to operation of said reed switch, and means actuated by said reed switch for indicating the volume of flow of said liquid as a function of the number of departures of a cup from said receiving position.

* * * * *